United States Patent
Wang

(10) Patent No.: US 6,702,447 B2
(45) Date of Patent: Mar. 9, 2004

(54) PROJECTION DISPLAY SYSTEM

(75) Inventor: Sze-Ke Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 10/065,954

(22) Filed: Dec. 4, 2002

(65) Prior Publication Data

US 2003/0107715 A1 Jun. 12, 2003

(30) Foreign Application Priority Data

Dec. 6, 2001 (TW) ....................... 90130586 A

(51) Int. Cl.[7] .............................................. G03B 21/28
(52) U.S. Cl. .......................................... 353/98; 359/726
(58) Field of Search ........................... 353/38, 69, 98.9, 353/9, 102, 122; 349/5, 7, 8; 359/726, 727, 732; 348/741–743

(56) References Cited

U.S. PATENT DOCUMENTS 4,981,352 A * 1/1991 Tejima et al. ................ 353/31
5,268,775 A * 12/1993 Zeidler ......................... 349/5
6,500,378 B1 * 12/2002 Smith ......................... 264/401
6,522,453 B2 * 2/2003 Yoneyama ................... 359/290
6,557,999 B1 * 5/2003 Shimizu ....................... 353/20

OTHER PUBLICATIONS

US 2003/0058414 A1.*

* cited by examiner

Primary Examiner—Russell Adams
Assistant Examiner—Michelle Nguyen
(74) Attorney, Agent, or Firm—Winston Hsu

(57) ABSTRACT

A projection display system that can diminish ghost images is disclosed. The projection display system includes an illumination system and an image system. The projection display system has a light source for emitting at least one light beam, and a field lens having a first surface and a second surface opposite to the first surface, the first surface having at least one reflection area. The image system utilizes the field lens and a light valve mounted adjacent to the second surface of the field lens for reflecting the light beam emitted by the light source. The light beam reflected from the light valve to the interface reflecting area is further reflected to a region outside of the light valve by the reflection area.

4 Claims, 7 Drawing Sheets

PROJECTION DISPLAY SYSTEM

BACKGROUND OF INVENTION

1. Field of the Invention

The present invention relates to a projection display system, and more particularly, to a projection display system capable of diminishing ghost images.

2. Description of the Prior Art

The rapid development of electro-optics technologies has made projection display devices become popular both in an office and at home. A projection display device projects images on a display, in the meantime, generating some blurs, such as ghost images. Ghost images downgrade the performance of projected images and consequently become a concern to design the projection display device.

Please refer to FIG. 1, which is a projection display system 10 according to the prior art The projection display system 10 comprises an illumination system 110 and an image system 120. As far as the illumination system 110 is concerned, white light beams, emitted by a light source 111 and reflected from a reflector 112, converge onto a color generator 113, such as a color wheel. The color generator 113 comprises a series of red, green, and blue filters for transforming the white light beams into colored light beams. After leaving the color generator 113, the colored light beams sequentially pass through a light-uniform device 114, such as an integration rod or a lens array, and through an illumination lens set 115 and reach a reflection mirror 116. The reflection mirror 116 reflects the colored light beams through a field lens 117 and finally onto a light valve 121, such as a digital micro-mirror device (DMD). Reflected by the light valve 121, the colored light beams, which are projected onto the light valve 121, pass through the field lens 117 again. The colored light beams then penetrate through a projection lens 122 and project onto a screen 124, composing the image system 120.

The light valve 121, which is mounted on a substrate, is formed with a plurality of pixel lenses disposed in a matrix, each pixel lens being capable of pivotably rotating around an axis within a range of 12 degrees. The pixel lenses reflect an incident light beam onto a region inside of the projection lens 122 and the incident light beam can project onto the screen 124 when the light valve 121 is in an ON-state. The pixel lenses reflect an incident light beam onto a region outside of the projection lens 122 and, of course, outside of the screen 124 when the light valve 121 is in an OFF-state.

However, not all the colored light beams will directly project from the light valve 121 onto the screen 124. Please refer to FIG. 2A to FIG. 2C, which show light paths of ghost images of the projection display system 10 according to the prior art. As the light valve 121 is in the ON-state, the white light beams, emitted by the light source 111 will sequentially pass through the color generator 113, the light-uniform device 114, the illumination lens set 115, the reflection mirror 116, and the field lens 117, and project onto the light valve 121. The light valve 121 reflects the colored light beams onto the field lens 117 again and a first surface 1171 of the field lens 117 reflects the colored light beam back onto the light valve 121, generating second reflection colored light beams. As shown in FIG. 2A to FIG. 2C, the light valve 121 still reflects the second reflection colored light beams through the projection lens 122 and onto the screen 124, forming so-called ghost images 1241. A corresponding focal point F located on a position near the light valve 121 and corresponding to the ghost images 1241 forms a virtual ghost-image light source 1211, which is extended along a direction from the focal point F toward the light valve 121. The virtual ghost-image light source 1211 projects colors light beams onto the screen 124 to generate the ghost images 1241. The ghost images 1241 undoubtedly downgrade the performance of the projection display system 10.

Please refer to FIG. 3A to FIG. 3C, which are schematic diagrams of a first projection display system capable of diminishing ghost images according to the prior art. In the first projection display system, a convex surface with a curvature radius R less than 50 mm is formed on a first surface 1172 of the field lens 117. As the colored light beams project onto the light valve 121 and the light valve 121 reflects the colored light beams onto the field lens 117, the convex surface reflects and focuses the reflected colored light beams to a focal point F1 between the light valve 121 and the convex surface. The reflected colored light beams continue to travel toward the light valve 121 to form a light-spreading area 1212. The light valve 121 reflects the reflected colored light beams onto the screen 124 through the projection lens 122, forming spreading images 1242 and diminishing ghost images. The spreading images 1242 are not ghost images, but reduced contrast for the first projection display system.

Please refer to FIG. 4A to FIG. 4C, which are schematic diagrams of a second projection display system capable of diminishing ghost images according to the prior art. In the second projection display system, a convexo-concave surface with a curvature radius R less than 0 mm is formed on a first surface 1173 of the field lens 117. As the colored light beams project onto the light valve 121 and the light valve 121 reflects the colored light beams onto the field lens 117, the convexo-concave surface diverges the reflected colored light beams toward the light valve 121 to form a light-spreading area 1213. The light-spreading area has a virtual focal point F2. The light valve 121 reflects the reflected colored light beams onto the screen 124 through the projection lens 122, forming another spreading images 1243. The spreading images 1243 are not ghost images either, but also reduced contrast for the second projection display system.

The above-mentioned prior art projection display systems solve the ghost images problem at the cost of contrast.

SUMMARY OF INVENTION

It is therefore an objective of the claimed invention to provide a projection display system that can effectively diminishing ghost images.

According to the claimed invention, the projection display system includes an illumination system and an image system. The projection display system has a light source for emitting at least one light beam, and a field lens having a first surface and a second surface opposite to the first surface, the first surface having at least one reflection area. The image system utilizes the field lens and a light valve mounted adjacent to the second surface of the field lens for reflecting the light beam emitted by the light source. The light beam reflected from the light valve to the interface reflecting area is further reflected to a region outside of the light valve by the reflection area.

It is an advantage of the claimed invention that a projection display system can diminish ghost images by using the field lens with appropriate curvature radius to reflect unwanted light beams to a region outside of the light valve of the projection display system.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
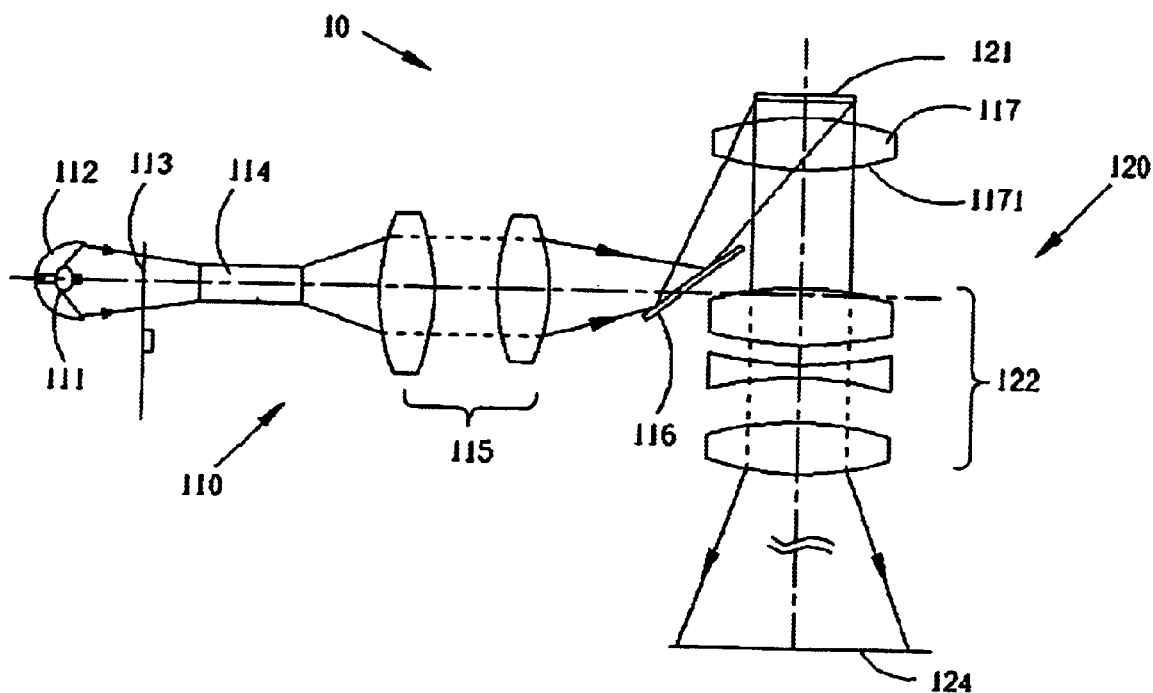
FIG. 1 is a schematic diagram of a projection display system according to the prior art.
Figure 2:
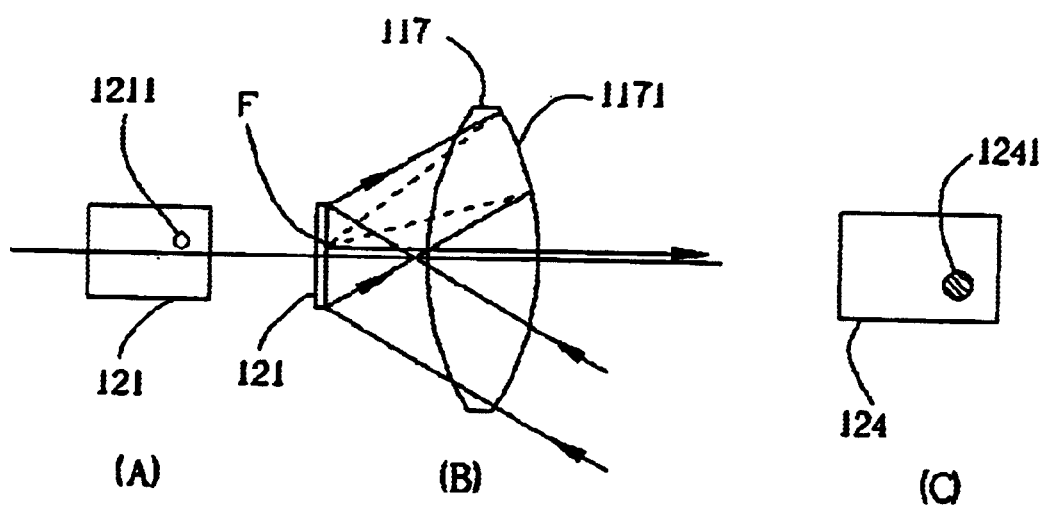
FIG. 2 is a schematic diagram showing how the projection display system of FIG. 1 generates image ghosts.
Figure 3:
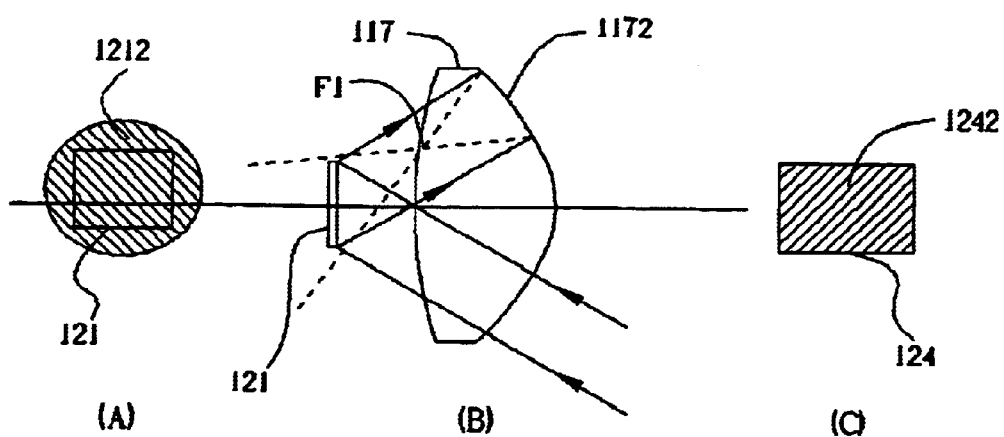
FIGS. 3A to 3C are schematic diagrams of a projection display system that can diminish ghost images according to the prior art.
Figure 4:
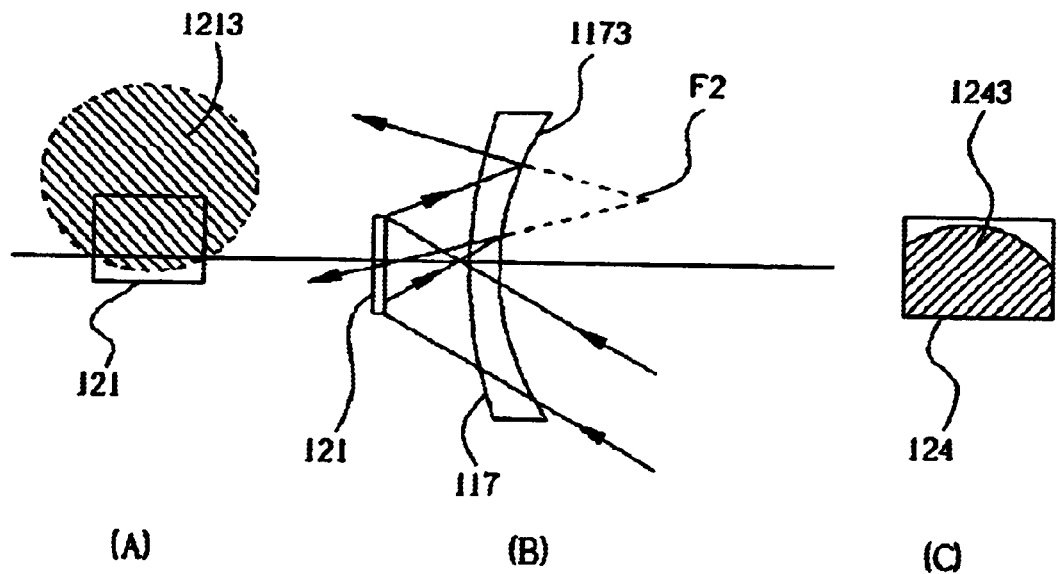
FIG. 4A to FIG. 4C are schematic diagrams of another projection display system that can diminish ghost images according to the prior art.
Figure 5:
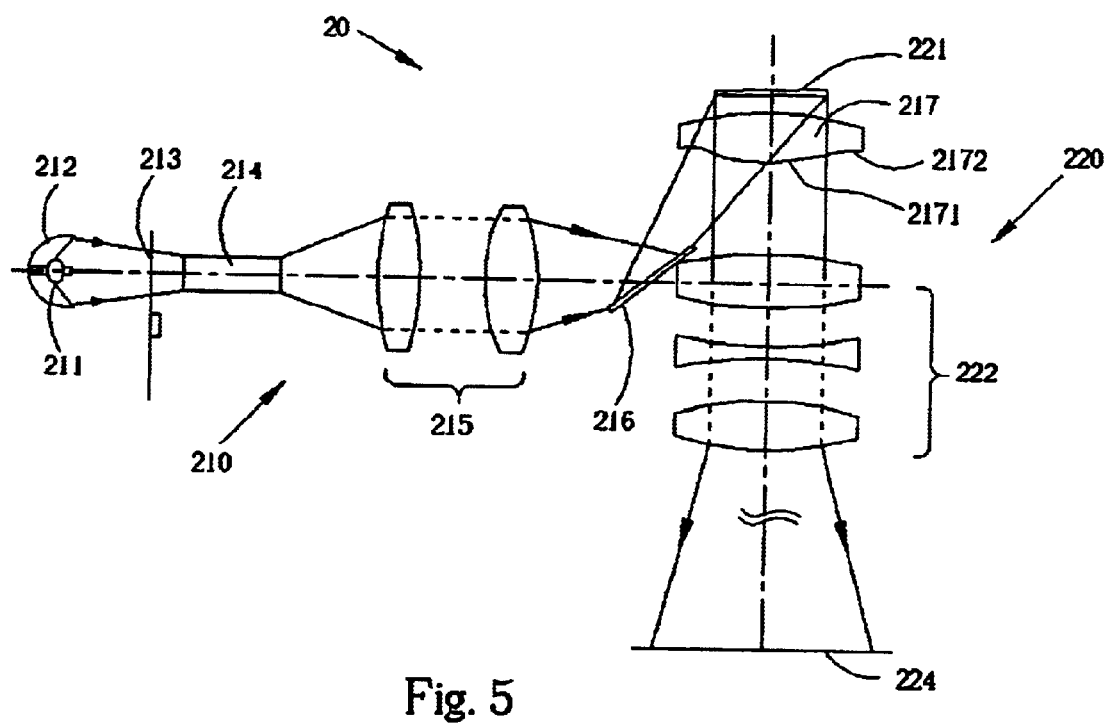
FIG. 5 is a schematic diagram of a projection display system according to the present invention.

Please refer to FIG. 5, which shows a projection display system 20 according to the present invention. The projection display system 20 comprises an illumination system 210 and an image system 220. As far as the illumination system 210 is concerned, white light beams emitted by a light source 211 and reflected from a reflector 212 converge onto a color generator 213, such as a color wheel. The color generator 213 comprises a series of red, green, and blue filters for transforming the white light beams into colored light beams. After leaving the color generator 213, the colored light beams sequentially pass through a light-uniform device 214, such as an integration rod or a lens array, and through an illumination lens set 215, and reach a reflection mirror 216. The reflection mirror 216 reflects the colored light beams through a field lens 217 and finally onto a light valve 221, such as a digital micro-mirror device (DMD). Reflected by the light valve 221, the colored light beams which were projected onto the light valve 221 pass through the field lens 217 again. The colored light beams then penetrate through a projection lens 222 and project onto a screen 224, composing the image system 220.

When the light valve 221 is in the ON-state (the definition of the ON-state for the light valve 221 is the same as that for the light valve 121 of the prior art projection display system), the white light beams that are emitted by the light source 211 will sequentially pass through the color generator 213, the light-uniform device 214, the illumination lens set 215, the reflection mirror 216, and the field lens 217, and project onto the light valve 221. The light valve 221 then reflects the colored light beam directly through the projection lens 222 and onto the screen 224.

When the light valve 221 is in the OFF-state (the definition of the OFF-state for the light valve 221 is the same as that for the light valve 121 of the prior art projection display system), the white light beams that are emitted by the light source 211 will sequentially pass through the color generator 213, the light-uniform device 214, the illumination lens set 215, the reflection mirror 216, and the field lens 217, and project onto the light valve 221. The light valve 221 then reflects the colored light beams onto a reflection area 2172 that is formed on a first surface 2171 of the field lens 217. The reflection area 2172 is disposed in a region adjacent to boundary of the first surface 2171. The reflection area 2172 reflects colored light beams reflected from the light valve 221 to a region outside of the light valve 221, diminishing ghost images originated from the prior art second reflection colored light beams.

To meet the requirement of effectively reflecting unwanted colored light beam to the region outside of the light valve 221, the reflection area 2172 is specifically designed. According to an experiment for the present invention, a curve is applied to form the first surface 2171 by pivoting around an axis. The equation for the curve is $$X=(1/R)Y^2/[1+(1-(1+K)*(1/R)^2*Y^2)]^{1/2}+A*Y^4+B*Y^6+C*Y^8+D*Y^{10},$$

wherein R is the curvature radius and ranges between 50 mm and 500 mm, and K, A, B, C and D are variables according to the projection display system 20. For example, if R equals 80 mm, $K\approx 0$, $A\approx -2.3892\times 10^{-6}$, $B\approx -7.2980\times 10^{-8}$, $C\approx -2.5287\times 10^{-10}$, and $D\approx 2.9488\times 10^{-13}$.

Figure 6:
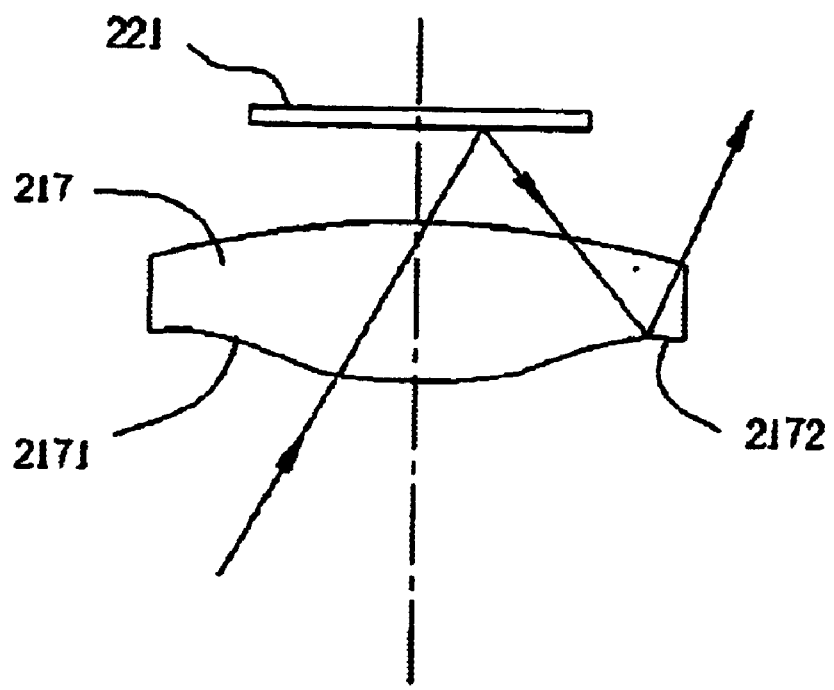
FIG. 6 is a schematic diagram of way of diminishing ghost images according to the present invention.

Please refer to FIG. 6, which is a schematic diagram of a first embodiment according to the present invention. In FIG. 6, the reflection area 2172 is a non-spherical surface. As incident light beams projects onto the interfere reflection area 2172, the reflection area 2172 having a curvature radius R can reflect the incident light beams to a region outside of the light valve 221. Therefore, the incident light beams will not enter the projection lens 222 and project onto the screen 224, diminishing ghost images. The curvature radius R ranges between 50 mm to 500 mm.

Figure 7:
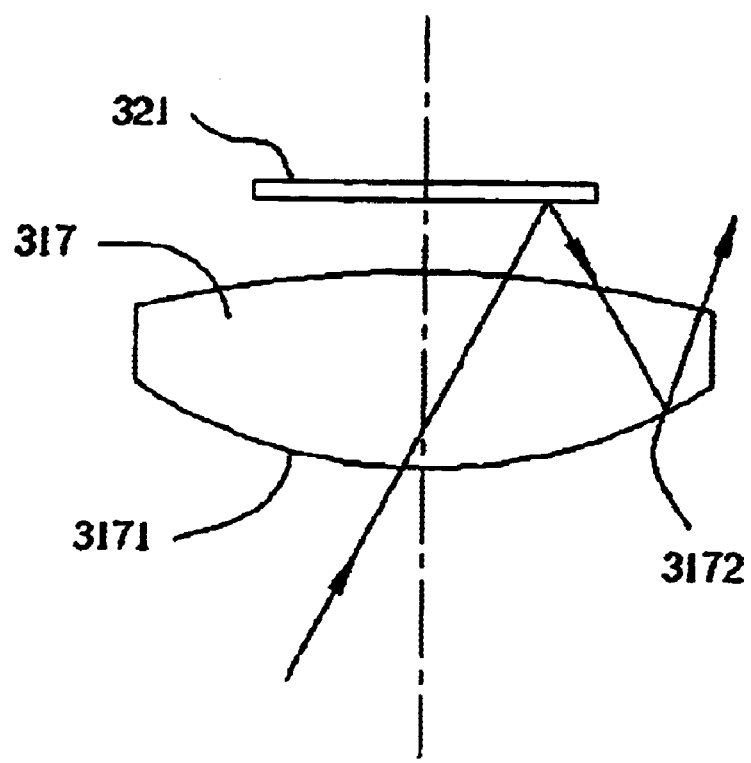
FIG. 7 is a schematic diagram of another way of diminishing ghost images according to the present invention.

Please refer to FIG. 7, which is a schematic diagram of a second embodiment according to the present invention. In FIG. 7, a reflection area 3172 of a first surface 3171 on a field lens 317 is a spherical surface. The curvature radius R of the spherical surface also ranges between 50 mm to 500 mm. For example, if the curvature radius R is 500 mm, the reflection area 3172 will reflect incident light beams to a region outside of the light valve 321. Therefore, the incident light beams will not enter the projection lens 222 and project onto the screen 224, diminishing ghost images too.

In contrast to the prior art projection display system, the present invention can provide a projection display system to diminish ghost images with a specifically designed field lens.

Following the detailed description of the present invention above, those skilled in the art will readily observe that numerous modifications and alterations of the device may be made while retaining the teachings of the invention. Accordingly, the above disclosure should be construed as limited only by the metes and bounds of the appended claims.

What is claimed is:

1. A projection display system capable of diminishing ghost images, comprising:
    an illumination system comprising:
        a light source for emitting at least one light beam; and
        a field lens having a first surface and a second surface opposite to the first surface, the first surface with a curvature radius from 50 mm to 500 mm comprising at least one reflection area; and
    an image system utilizing the field lens and a light valve mounted adjacent to the second surface of the field lens for reflecting the light beam emitted by the light source;
    wherein the light beam reflected from the light valve to the reflection area is further reflected to a region outside of the light valve due to the interface reflection area.

2. The projection display system of claim 1, wherein the field lens is a non-spherical mirror.

3. The projection display system of claim 2, wherein the first surface is formed by pivoting a curve around an axis, an equation for the curve being $X=(1/R)Y^2/[1+(1-(1+K)*(1/R)^2*Y^2)]^{1/2}+A*Y^4+B*Y^6+C*Y^8+D*Y^{10}$, wherein R is the curvature radius, R. 80 mm, K. 0, A. $-2.3892\times10^{-6}$, B. $-7.2980\times10^{-13}$.

4. The projection display system of claim 1, wherein the field lens is a spherical lens.

* * * * *